United States Patent [19]

New

[11] 3,820,965

[45] June 28, 1974

[54] METHOD OF REDUCING ENVIRONMENTAL POLLUTION BY UTILIZING STACK GASES, RESULTING FROM THE BURNING OF FOSSIL FUELS, AND WATER, INCLUDING SEA WATER AND WASTE WATER, TO MANUFACTURE HYDROCARBON ENERGY FUEL, POTABLE WATER AND OTHER COMMERCIAL PRODUCTS

[76] Inventor: Robert V. New, 6356 Del Monte, Houston, Tex. 77027

[22] Filed: Apr. 2, 1973

[21] Appl. No.: 347,048

Related U.S. Application Data

[63] Continuation-in-part of Ser. No. 207,050, Dec. 31, 1971, abandoned, which is a continuation-in-part of Ser. No. 191,322, Oct. 21, 1971, abandoned, which is a continuation-in-part of Ser. No. 164,691, July 21, 1971, abandoned, which is a continuation-in-part of Ser. No. 138,034, April 18, 1971, abandoned.

[52] U.S. Cl. ............... 48/197 R, 23/252 R, 23/260, 23/288 R, 23/288 J, 166/272
[51] Int. Cl. .......................... B01j 9/04, E21b 43/23
[58] Field of Search ............ 48/197 R, 209, 62, 89; 23/288 R, 288 J, 260, 262, 263, 252 R; 260/449 M; 219/121 P, 383

[56] References Cited
UNITED STATES PATENTS

| | | | |
|---|---|---|---|
| 2,238,367 | 4/1941 | Mohr et al. ...................... | 48/197 R |
| 2,606,827 | 8/1952 | Glover .............................. | 48/204 |
| 3,140,421 | 7/1964 | Spongberg .................. | 219/121 P X |
| 3,241,927 | 3/1966 | Eberhardt et al. ................ | 23/288 R |
| 3,372,989 | 3/1968 | Macklin ............................ | 23/262 X |
| 3,619,365 | 11/1971 | Croft et al. .................. | 260/449 M X |
| 3,625,664 | 12/1971 | Padovani ......................... | 48/197 R |

Primary Examiner—Joseph Scovronek
Attorney, Agent, or Firm—Strauch, Nolan, Neale, Nies & Kurz

[57] ABSTRACT

A method and apparatus for treating smoke stack gases diverted to minimize air pollution to recover from the stack gases the individual constituents thereof, namely, carbon dioxide ($CO_2$), water ($H_2O$) and nitrogen ($N_2$) freed of other products, such as oxides; and to recover from water (including non-potable water such as sea water, waste water and even polluted water sources) the individual constituents thereof of interest here, namely, hydrogen ($H_2$); and delivering the recovered carbon dioxide and the recovered hydrogen into a catalytic reaction chamber under sufficiently high temperature conditions in the presence of a suitable catalyst to establish therein a reaction temperature to support a Sabatier catalytic reaction ($CO_2 + 4H_2 = CH_4 + 2H_2O$) hydrogenating the carbon dioxide to form methane for use as fuel, and potable water for commercial usage. The apparatus suitable for practicing the method comprises a gas flow line including means for diverting a substantial portion of the plant stack gases through variant serially arranged processing means to cool the gases, remove deleterious compounds, and recover the useful components, namely, carbon dioxide, nitrogen and water; a water flow line for delivering appropriate quantities of sea, river, lake, and even polluted water through variant serially arranged processing means to either electrolytically or by direct fired heating and chemical reaction processing to convert the water into its constituents hydrogen and oxygen, or hydrogen and carbon monoxide, or hydrogen and metal oxide, and recovering the hydrogen; and means for combining the separated carbon dioxide and hydrogen in a catalytic reaction chamber at a suitable temperature in the presence of a suitable catalyst to sustain a Sabatier reaction ($CO_2 + 4H_2 = CH_4 + 2H_2O$), the suitable temperature preferably being provided either by use of ionizing transducers or direct fired heaters for heating the gases as they enter the reaction chamber, and separating the resulting methane ($CH_4$) and pure water for commercial use as fuel and potable water. The useful by-products, nitrogen, metal oxides, and oxygen produced when the water is dissociated, are diverted for economical usage.

24 Claims, 6 Drawing Figures

INVENTOR
ROBERT V. NEW

METHOD OF REDUCING ENVIRONMENTAL POLLUTION BY UTILIZING STACK GASES, RESULTING FROM THE BURNING OF FOSSIL FUELS, AND WATER, INCLUDING SEA WATER AND WASTE WATER, TO MANUFACTURE HYDROCARBON ENERGY FUEL, POTABLE WATER AND OTHER COMMERCIAL PRODUCTS

CROSS REFERENCE TO RELATED APPLICATION

This is a continuation-in-part of application Ser. No. 207,050, filed Dec. 31, 1971 as a continuation-in-part of Ser. No. 191,322, filed Oct. 21, 1971, as a continuation-in-part of application Ser. No. 164,691, filed July 21, 1971, which in turn in a continuation-in-part of application Ser. No. 138,034, filed Apr. 18, 1971, each of which is now abandoned.

BACKGROUND OF THE INVENTION

One of the most vexing problems, particularly of large cities in America and other industrial nations, is the pollution of the air by the waste products of combustion of fossil fuels (gas, oil, coal) burned in the boilers and furnaces of power plants, refineries, factories, mills, heating plants, etc. These gases, generally called stack gases, contain large amounts of $CO_2$ plus $N_2$, $H_2O$, and/or sulfur oxides and compounds of nitrogen, etc., all of which are presently expelled into the atmosphere as pollutants through "smoke stacks." Large sums of money must be spent if this pollution is to be abated, since these stack gases are now treated as waste and no benefit is derived from them.

An equally vexing problem is the shortage of clean combustible energy fuel, which shortage promises to become even much more critical. This adversity dictates the increasing burning of the less desirable fossil fuels, such as coal and high sulfur content oil as a substitute. These substitute fuels by their very nature further compound the pollution problem presently estimated by press quotations of government officials as 25 percent due to stack gases.

It will be apparent from the preceding discussion that large heat generating installations (electrical generating plants, steel mills, oil refineries, etc.) located in or near great cities and burning huge quantities of fossil fuel (gas, oil, coal) waste into the atmosphere millions of tons of carbon (combined with oxygen in the form of $CO_2$) originally obtained at considerable expense either by drilling for and producing gas and/or oil or by mining to obtain coal. Such production, of necessity expensive in iteslf, carried on at locations far removed from the site of use, necessitates very large investment to which must be added the substantial expense for transportation to the remotely located consuming large heat generating installations.

These heat generating installations would of preference burn clean fuel natural gas which is now in short supply; in crisis situation. So, too, oil, particularly cleaner burning low sulfur content oil. As a consequence, America is becoming more and more dependent on "unstable" foreign oil sources, and creating a potentially increasing pollution problem as well as a disastrous balance of payments situation. Coal, though of large quantities in the ground, is an energy fuel of considerable sulfur content and, therefore, a bad air contaminant. It requires the expense of mining and transportation to the site of use. Even when gasified, it is more expensive as an energy fuel than the sulfur free, clean burning, reconstituted hydrocarbon gas made on the site of use by this invention, and also requires transport to the site of use.

As an example, large electrical generating plants in any of the large coastal cities burn millions of cubic feet per day of natural gas produced in Texas, Louisiana or Canada and transported by pipeline to the site of use. It costs more to transport it than the original well-head price of the gas. Imported cryogenic gas is vastly more expensive.

This invention provides for the on site recycling of the almost incalculable quantities of carbon discarded as waste products ($CO_2$) and the recovery of the utterly limitless quantities of hydrogen contained in all water, including the vastness of oceans, and brings these two together to produce methane ($CH_4$) a fuel gas that is exactly the same as the highest quality clean natural gas, pure water and free nitrogen ($N_2$).

The cost per cubic foot, per BTU, of such reconstructed natural gas, while it may be higher than the arbitrarily fixed well-head price of natural gas, will, because it is created at the site of use, be no more expensive than such natural gas delivered a considerable distance to large cities, and should indeed be considerably cheaper than gasified coal, or than cryogenic gas imported from "unstable" foreign sources that must be created at high cost and transported long distances to the site of use.

This invention is premised on a basic scientific natural law, i.e., that nothing can be destroyed; form can be changed — but nothing destroyed. This applies specifically to the carbon content of carbon dioxide as contained in stack gases. In a heat generation plant, such as a large electrical generating station, natural gas (largely methane - $CH_4$) is preferably fed into the boiler in a mixture of relatively one part gas to ten parts air. The combustion reaction produces the heat energy required for work and separates the carbon atoms of the hydrocarbons ($CH_4$) from the hydrogen and combines them with oxygen of the air to form $CO_2$, now normally a waste product discharged into the atmosphere, and water. The carbon thus expelled from the smoke stack as a component of carbon dioxide contains the quantities of carbon atoms originally injected into the boiler as fuel, whether injected as gas, oil or coal. Because the carbon atoms are not destroyed, they are available for the needs of this invention: to be separated from the oxygen with which they have been combined by combustion to form carbon dioxide, then to be recovered and recombined for reuse with hydrogen contained in $H_2O$ to form new synthetic natural gas (methane – $CH_4$).

In this invention it is preferable to use the hydrogen contained in water, limitless quantities being available in sea water, and lesser quantities being available in lake or river water and even waste water, for example the discharge from plant coolant systems, runs off rain water from storm drainage systems and even polluted sewage water, to effect a two way attack on environmental pollution. The invention utilizes certain premises known in the sciences to effect its purposes, but there has been no recognition or suggestion of applying this knowledge in solving these long recognized pollution problems. By this invention, these known scientific premises are novelly applied to solve these pollution problems in a manner that is practically efficient and economically sound for a six-fold reason:

1. By placing a commercial useful value upon the tremendous quantities of the undestroyed, presently wasted, element carbon derived from stack gases while simultaneously abating air pollution.
2. By creating new and multiplying sources of hydrocarbon energy fuel ($CH_4$) by utilizing and reutilizing the carbon atoms of the $CO_2$ constituent of combustion gases and combining them with the hydrogen molecules ($H_2$) of water to form reconstructed methane ($CH_4$) natural gas. This methane is in turn combusted in the boilers as fuel; the cycle repeats and repeats and repeats ad infinitum. So, this invention allows the carbon atoms to be used and reused times without limit; it has the characteristics of an energy fuel "breeder."
3. By creation of a source of energy fuel at the site where it can be used, thus avoiding the high cost of drilling for, mining, and transporting the fuel.
4. By utilization of hydrogen available in utterly limitless quantities from water (particularly sea water, and even polluted water), a raw material at no cost.
5. By providing substantial quantities of pure water as a product of this process.
6. By providing available commercial $N_2$.

SUMMARY OF THE INVENTION

This invention utilizes the "waste" combustion products known as "stack gases." Such raw stack gas comprises about 10% $CO_2$, 20% $H_2O$ and 70% $N_2$, nitrogen compounds, (and possibly sulphur compounds, carbon particles, ash, etc.) the whole constituting an atmospheric pollutant that has now become a great hazard to health and well-being in large areas of the industrial nations, particularly the large cities in such nations. These atmospheric pollutants must be eliminated; as of now the cost of pollution elimination is great with no remitting circumstances because no part thereof is economically utilized.

This invention utilizes the hydrogen ($H_2$) of free (sea and waste) water to hydrogenate the carbon (C) of carbon dioxide ("waste" stack gas) for the manufacture at the site of use of methane ($CH_4$) as an energy fuel, and produces also potable water ($H_2O$) and nitrogen ($N_2$).

A primary object of this invention resides in providing a method of utilizing, (1) substantial portions of the waste stack gases from the smoke stacks of industrial plants diverted to minimize air pollution and reduced to provide a source of carbon dioxide ($CO_2$), and (2) sea and other nonpotable water sources reduced to provide a source of hydrogen ($H_2$) to be introduced simultaneously with the $CO_2$ into a catalytic reaction chamber in the presence of a suitable catalyst to induce a Sabatier reaction $CO_2 + 4H_2 = CH_4 + 2H_2O$ thereby hydrogenating the carbon dioxide to form hydrocarbon energy fuel to be recycled, and pure distilled water.

Another important object of this invention resides in providing a method to recover the $CO_2$ content of stack gases diverted to minimize air pollution and hydrogenate the $CO_2$ in a catalytic reaction chamber to form methane and pure water, with the required hydrogen recovered from the chemical decomposition of water by means, for example, of passing superheated steam over finely divided suitable metal to cause an oxidation-reduction reaction to separate the hydrogen ($H_2$) of the water, and resulting further in joining the oxygen to the metal to make metal oxide.

A further important object of the present invention resides in providing a method of utilizing substantial portions of the waste stack gases from smoke stacks reduced to minimize air pollution and provide sources of carbon dioxide, nitrogen and water, and a natural water source (such as sea water and/or other non-potable water sources) reduced by first heating the water in a gas fired heater to convert it to superheated steam and then directing the steam, together with oxygen, into contact with a carbon mass contained in a reaction chamber and burning at incandescence, thereby effecting a decomposition of the steam to its components hydrogen and carbon monoxide to free and recover the hydrogen for combining with the carbon dioxide at suitable temperature in a subsequent Sabatier reaction ($CO_2 + 4H_2 = CH_4 + 2H_2O$) to produce methane as a commercial energy fuel, and to combine the total oxygen with the carbon of the incandescent mass to produce and recover the resultant carbon monoxide for use as processing fuel.

Another important object of the present invention resides in the provision of suitable apparatus means for shunting substantial portions of the stack gases from the smoke stacks into a gas flow line to minimize air pollution and treating the gases to separately recover the water, nitrogen and carbon dioxide components, a means for expelling the water and separating the nitrogen component from the carbon dioxide component and directing the nitrogen to a storage facility (or venting it to the air as it is a non-polluting, non-toxic gas) and directing the carbon dioxide through a heating means to raise its temperature to a sufficiently high temperature to induce, when introduced together with corresponding high temperature hydrogen into a catalytic reaction chamber in the presence of a suitable catalyst, a Sabatier reaction ($CO_2 + 4H_2 = CH_4 + 2H_2O$) thereby hydrogenating the carbon dioxide to form methane and pure water.

A further important object of the present invention resides in the provision of suitable apparatus means for supplying large quantities of water (such as non-potable sea water or waste water) into a water flow line including a water decomposition unit of the electrolytic type for separating the oxygen component of the supplied water from the hydrogen component, directing the oxygen component to a discharge point and directing the hydrogen component through a heating means to raise its temperature to a sufficiently high temperature to induce, when introduced with corresponding high temperature carbon dioxide recovered from stack gas diverted to minimize air pollution into a catalytic reaction chamber in the presence of a suitable catalyst, a Sabatier reaction ($CO_2 + 4H_2 = CH_4 + 2H_2O$) thereby hydrogenating the carbon dioxide to form methane and pure water.

Still another object of the present invention resides in providing the apparatus of the two next preceding objects with a catalytic reaction chamber having respective electric arc actuated ionization transducers connected thereto for separately raising the temperature of the directed carbon dioxide and hydrogen to sufficiently high temperature as they enter the catalytic reaction chamber to induce the Sabatier reaction ($CO_2$ + 4H$_2$ = CH$_4$ + 2H$_2$O) thereby hydrogenating the carbon dioxide to form methane and pure water.

A still further object of the present invention resides in providing the apparatus of the aforesaid two next preceding objects with a gas fired heater through which the directed carbon dioxide and hydrogen pass as they enter the catalytic reaction to raise the temperature of the entering gases to sufficiently high temperature to induce the Sabatier reaction (CO$_2$ + 4H$_2$ = CH$_4$ + 2H$_2$O) thereby hydrogenating the carbon dioxide to form methane and pure water.

A further object of the present invention resides in providing the gas fired heater of the preceding object with a stack outlet for its stack gas and connecting the stack outlet into the gas flow line to add the combustion gases of the gas fired heater to the diverted stack gases thereby eliminating these process produced combustion gases as an air pollutant.

A further object of the present invention resides in the provision of a suitable apparatus assembly comprising a catalytic reaction chamber containing a suitable catalyst and designed to receive high temperature carbon dioxide recovered from plant stack gases diverted to minimize air pollution and high temperature hydrogen recovered by decomposition of water (non-potable sea water, river or lake water, waste water) heated to temperatures sufficiently high to establish a reaction temperature in the reaction chamber to maintain a Sabatier reaction (CO$_2$ + 4H$_2$ = CH$_4$ + 2H$_2$O) hydrogenating the carbon dioxide to form methane and pure water as end products to be separated and recovered for on site use as energy fuel and as potable water, a water flow line including pump means for supplying large quantities of such water through a series of treating units including a heat exchanger including coils for passing the hot gaseous products in heat exchanging relation with the incoming water to cool the gaseous end products and preheat the incoming water, a direct fired heater-super heater for converting the preheated incoming water to super-heated steam, a direct fired reaction chamber maintaining a reaction chamber temperature of the order of 1,000°C and containing carbon burning at incandescence into which the super-heated steam deleterious gases together with oxygen (O$_2$) is directed to effect the decomposition of the steam to hydrogen and carbon monoxide (the the reaction being C + H$_2$O = H$_2$ + CO), means for separating the hydrogen and carbon monoxide and directing the hydrogen through the direct fired heater-super heater to provide the high temperature hydrogen and directing the carbon monoxide as processing fuel to the heater-super heater and to effect the burning in the direct fired reaction chamber.

A still further object of the present invention resides in the provision of means for establishing (1) a gas flow line for diverting substantial portions of the waste stack gases from smoke stacks to minimize air pollution and treating the gases to separately recover the carbon dioxide, nitrogen and water components; (2) means for establishing a water flow line for withdrawing quantities of water from a natural source (such as sea water or other non-potable water) and heating the withdrawn water by means of direct fired heater means to convert it to super-heated steam and directing the steam together with oxygen into contact with a burning carbon mass contained in a reaction chamber (direct fired to a kindling temperature) to raise the mass to incandescence thereby effecting a conversion of the steam to its component elements (hydrogen and oxygen) to free and recover the hydrogen and combine the oxygen wih the carbon of the incandescent mass to produce and recover carbon monoxide for use as energy fuel for the direct fired heater means; (3) means for directing the recovered carbon dioxide and hydrogen first through the direct fired heater means to raise them to a suitably high temperature and then through a catalytic reaction chamber to establish the required reaction temperature in the catalytic reaction chamber to convert them by an exothermic catalytic Sabatier reaction into methane for use as a commercial energy fuel; (4) means for diverting the stack gases of the direct fired reaction chamber and the direct fired heater means into the gas flow line to augment the diverted waste stack gases for processing.

A still further object of this invention resides in the provision of means for establishing (1) a gas flow line for diverting substantial portions of the waste stack gases from smoke stacks to minimize air pollution and treating the gases to separately recover the carbon dioxide, nitrogen and water components; (2) means for establishing a water flow line for withdrawing water from a natural source (such as sea water or other non-potable water) including electrolytic cell means to separate the water into its component elements hydrogen and oxygen, to free and recover the hydrogen (H$_2$) for purposes of this invention, and to free and recover the oxygen (O$_2$) for further desired use; and (3) means including heater means for heating the recovered carbon dioxide and recovered hydrogen to a suitable temperature and a catalytic reaction chamber for receiving the heated carbon dioxide and heated hydrogen to establish the required reaction temperature in said catalytic reaction chamber to convert the carbon dioxide and hydrogen by catalytic reaction into methane for use as a commercial energy fuel.

BRIEF DESCRIPTION OF DRAWINGS

Further objects will appear from the following description and appended claims when read in conjunction with the accompanying drawings wherein:

DESCRIPTION OF METHOD

Figure 1:
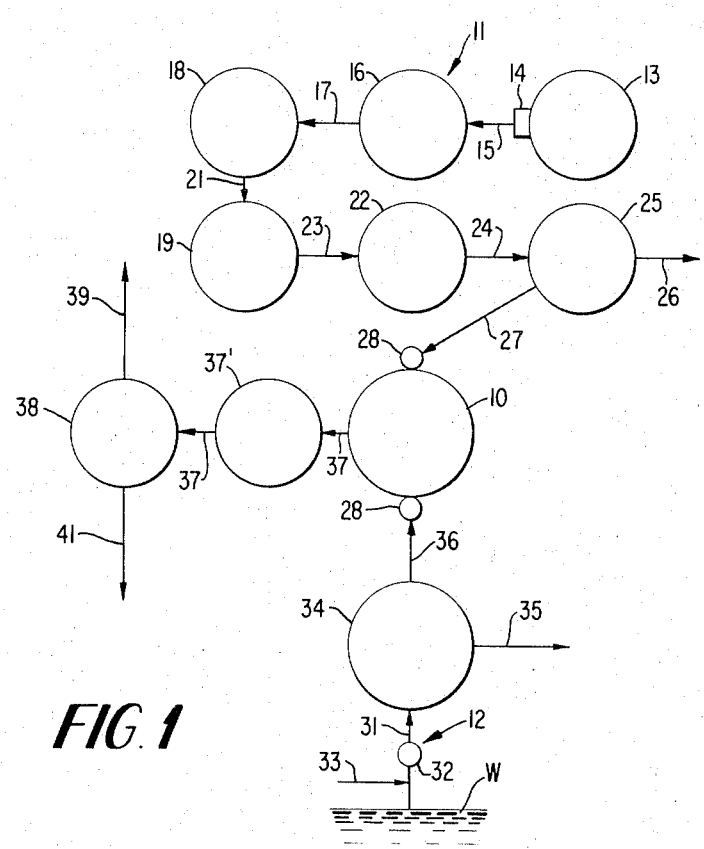
FIG. 1 is a schematic flow diagram illustrating an electrical apparatus embodiment for producing methane and pure water in accord with the present invention utilizing the carbon dioxide component of diverted stack gas of an industrial plant and the hydrogen component of water diverted from an available source of water.

With continued reference to the drawings wherein the same reference numerals are employed throughout to indicate the same parts, the method preferably contemplates installation of the equipment for practicing the present invention at an electric power plant or similar industrial plant located on the shoreline near a large body of available water, such as the ocean, an inland bay of the ocean, a large lake or large river. In such an installation, the large quantities of water required in practicing the invention can be obtained from the ocean, bay, lake or river augmented as may be deemed advisable by the waste water from the plant's general operations, including the storm sewage system and effluent from the sanitary sewage system. The stack gas will be obtained from the one or more plant smoke stacks in volume commensurate with maintaining an adequate stack draft in the smoke stack or the several stacks where more than one stack is available. The produced hydrocarbon fuel ($CH_4$) and pure water may be fed directly into the plant's fuel storage facilities and the plant's primary water systems thereby reducing the fuel costs and the clean water needed to be withdrawn from the adjacent environmental sources for normal plant operations. It follows, therefore, that the present invention not only materially decreases both the air and water pollution incident to normal plant operation, but at the same time produces substantial quantities of clean gas fuel for plant operation (and saleable by-products) to effect savings in the amount of fuel required to be purchased from available commercial sources and reduces the amount of water to be withdrawn from adjacently related, limited sources of water supply needed for other usages.

With these general advantages in mind and referring for the moment to FIG. 1 of the drawings, the apparatus required consists of a catalytic reaction chamber 10 of suitable construction for the hydrogenation of carbon dioxide through a Sabatier catalytic reaction to manufacture methane ($CH_4$) and pure water ($H_2O$), a gas flow line, generally designated by numeral 11, for diverting and conveying quantities of stack gases through serially arranged processing units to recover the carbon dioxide component and nitrogen component of the stack gases, separate these gaseous components, direct the nitrogen to storage facilities, an immediate end use, or venting it to the atmosphere, and directing the carbon dioxide to the catalytic reaction chamber 10; and a water flow line, generally designated by numeral 12, for supplying and conveying requisite quantities of water through electrolytic cells to convert the water into its constituent elements, hydrogen and oxygen, and directing the separated hydrogen to the catalytic reaction chamber 10 while disposing of the oxygen (and deleterious compounds if any) in any suitable manner.

While gas flow line 11 may incorporate any suitable serial arrangement of processing units to effect recovery of the carbon dioxide and nitrogen components of the stack gases, it is illustrated to include the below-described serial arrangement. At its originating end at the stack 13, gas flow line 11 is provided with a conventional diverting mechanism 14 for diverting substantial portions of the ascending gaseous products of combustion of fossil fuel and air into flow line 11. In well known fashion the diverting mechansim 14 is automatically valved to divert proportionate quantities of the ascending gases in accord with the variations in the stack draft to maintain a diversion of desired quantities of the ascending gases.

These diverted gases shunted into gas flow line 11 pass from diverting mechanism 14 through line 15 to a conventional catalytic treating unit 16, preferably employing a platinum bead type catalyst, to effect removal of certain of the deleteriour oxides. From the catalytic treating unit 16 the partially cleaned gases pass through line 17 to a conventional cooling tower 18, for example, preferably a convection air type cooling tower or a water quench type cooling tower. Tower 18 is provided to reduce the temperature of the gas to a suitable level, say about 100°C. to assure efficient operation of the compressor 19 into which the cooled gas enter through line 21.

Compressor 19 compresses the gases to an optimum pressure at which the following dehydration unit 22 connected through line 23 operates most efficiently. Dehydration unit 22 may be of any suitable conventional construction, for example, a unit employing a zeolite type molecular sieve desiccant or the equivalent, capable of reducing the water content of the gas to approximately 1 pound per million cubic feet. Dehydration unit 22 also removes any remaining deleterious compounds thus reducing the gases issuing from unit 22 to the carbon dioxide and nitrogen components of the original stack gases.

From dehydration unit 22, the carbon dioxide and nitrogen components pass along line 24 into any suitable gas separating unit 25 capable of separating the nitrogen from the carbon dioxide. The separated nitrogen is directed through outlet line 26 to suitable storage facilities for commercialization on the available market. The separated carbon dioxide issues from gas separating unit 25 through line 27 connected through an ionizing electric arc transducer 28 to an inlet of catalytic reaction chamber 10.

Water flow line 12 includes an intake line 31 which includes a suction pump 32 for removing large quantities of water as required from a water source W, preferably a large body of water such as the sea, a salt water bay, a large lake or large river. Alternatively, the line 12 may be connected to a supply conduit leading from a remotely located water source such as the sea, salt water bays, large lakes or large rivers and may be provided with a branch supply line 33 supplying waste water from other plant operations, the storm sewer system of a nearby city or the lake, or even to the effluent outlet of a city sanitary sewer system to augment the water source W. Any water sources, fresh water, sea or bay water, polluted river water, or sewage effluent, free of solids, combined or separately providing sufficient quantities of water may be used.

The water passing through pump 32 and issuing from the pump outlet line 31 enter conventional electrolytic cell means 34 capable of converting the water into its chemical constituents, hydrogen and oxygen, and separating the oxygen for removal through outlet line 35 for discharge or further processing as may be desired. The remaining hydrogen component issues through line 36 and ionizing transducer 28 to a second inlet of catalytic reaction chamber 10.

Referring for the moment to catalytic reaction chamber 10, the scientific literature abounds with suitable chambers and many catalytic reaction chambers for the hydrogenation of organic compounds have been designed and are in operation. While known direct fired reaction chambers may be used in carrying out this invention, the embodiment now under consideration employs electric arc ionization transducers 28 operating as disclosed in my previously issued U.S. Pat. No. 3,522,846, issued Aug. 4, 1970, and entitled Method and Apparatus For Production Amplification By Spontaneous Emission of Radiation. The ionization transducers 28 operate to pass electrical arc discharges through the carbon dioxide gas and hydrogen gas entering chamber 10 imparting to the molecules a state of great excitation with a resultant rise in temperature sufficient to establish in the chamber a reaction temperature to initiate a Sabatier reaction (as hereinafter set forth). The gases enter the catalytic reaction chamber 10 in controlled proportions of approximately 80 percent hydrogen and 20 percent carbon dioxide. The excited molecules, therefore, establish the required reaction temperature of about 300°–400°C. (the catalytic reaction is exothermic) within the reaction chamber to achieve the Sabatier reaction over the catalyst, preferably nickel (see "Catalysis in Organic Chemistry" by Paul Sabatier, translated by E. Emmet Reid, Van Nostrand Co., 1922, paragraphs 393–402 inclusive). Reaction temperatures may be easily calculated from the references incorporated herein and made a part hereof for rapid reaction in which the $CO_2$ is readily hydrogenated to $CO_2 + 4H_2 = CH_4 + 2H_2O$).

The resulting methane ($CH_4$) and water vapor ($2H_2O$) at the reaction temperature pass from reaction chamber 10 through line section 37 and a cooling unit 37' to separating tower 38 where the steam condenses below 100°C. to discharge as pure water through lowermost outlet line 39 to be recovered and used as high grade potable water, and the methane is discharged through upper outlet line 41 for recycling through the plant's fuel facilities or storage for such other use as may be desired.

Figure 2:
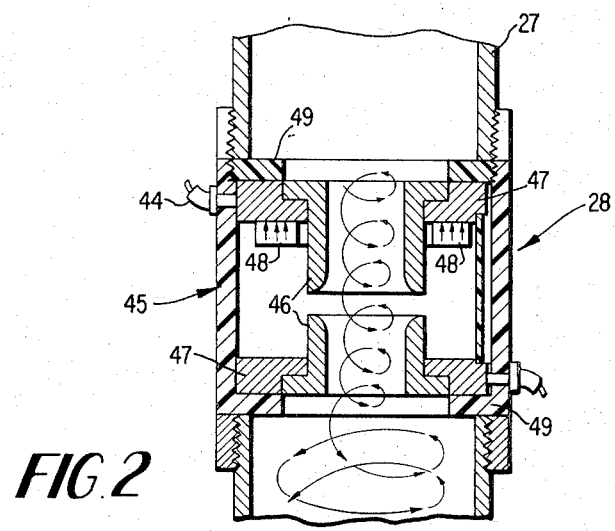
FIG. 2 illustrates schematically in section a suitable electric arc actuated ionizing transducer used in the embodiment of FIG. 1 for creating and maintaining excitation of the molecules of the carbon dioxide gas component and the hydrogen gas component produced in the embodiment of FIG. 1 to provide the required reaction temperature in a catalytic reaction chamber to hydrogenate the carbon dioxide and produce the methane and pure water in accord with this invention.

FIG. 2 schematically details one of the preferred forms of ionization transducers 28, as disclosed in my aforesaid Letters Patent. It is a D.C. operated plasma tube electrode arrangement in which electrical supply cable 44 is connected to an electrode assembly 45 made up of suitable opposing tungsten electrodes 46 mounted in electrode holders 47 made of suitable material (such as copper) and also mounting permanent magnets 48 arranged to create a static field (see arrows) to impart rotation to the arcs bridging electrodes 46 to minimize burning of the electrodes and imparting a swirling or rotational effect to the flow-through of gas assuring that all parts and portions of the gas come in contact with the ionizing sparks (arcs). The entire mechanism of electrode assembly 45 is insulated from undesirable contacts by insulation rings 49 made of suitable material (such as refractory material).

DESCRIPTION OF ANOTHER APPARATUS EMBODIMENT

Figure 3:
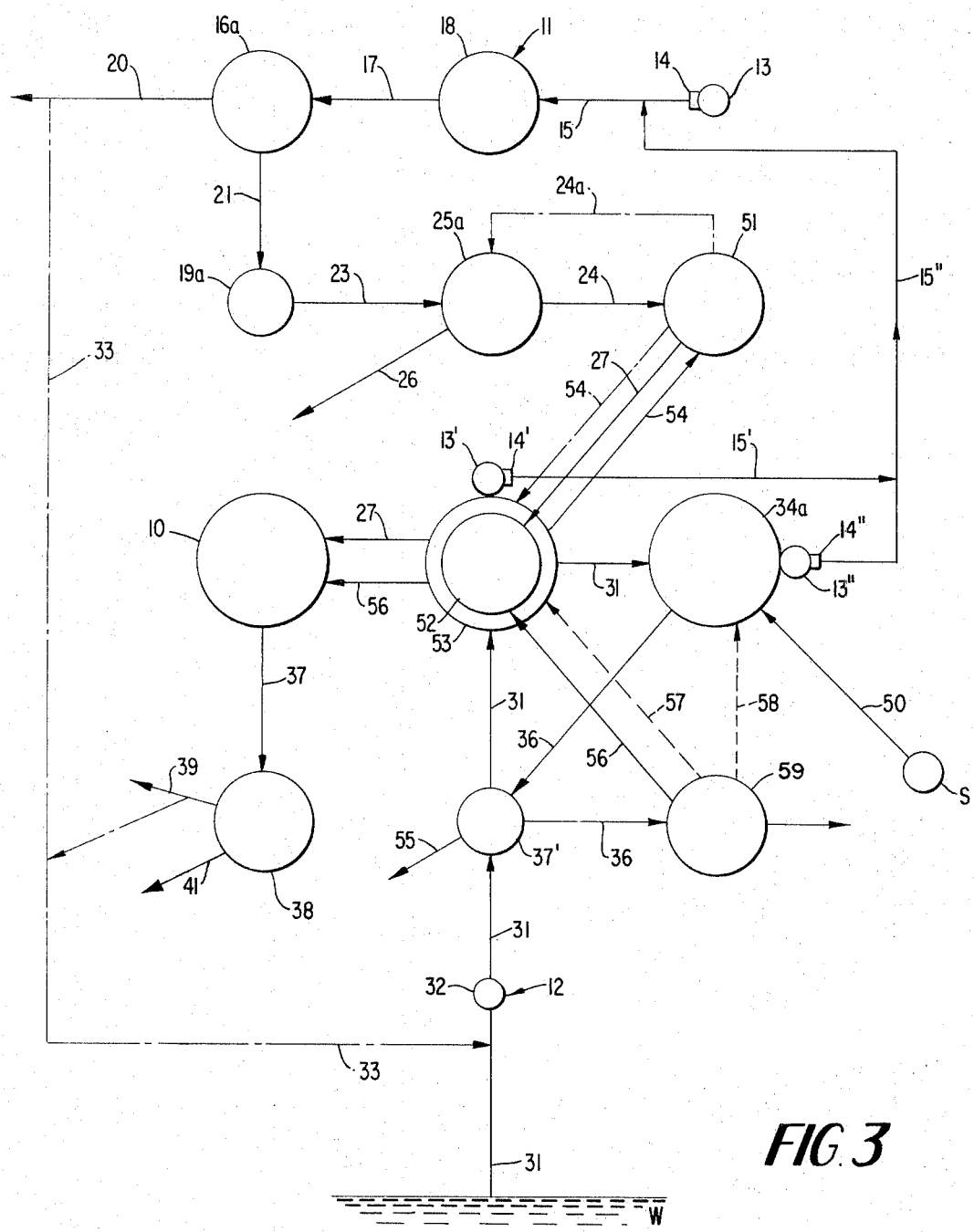
FIG. 3 is a schematic flow diagram illustrating a gas fired apparatus embodiment for producing methane and pure water in accord with the present invention utilizing the carbon dioxide component of diverted stack gas and the hydrogen component of water diverted from an available source of water and obtained by direct fired reaction chamber processing of the water to at the same time provide carbon monoxide as a process fuel providing, when burned, an additional source of stack gases to be diverted for processing along with the primary stack gases of the industrial plant.
Figure 4:
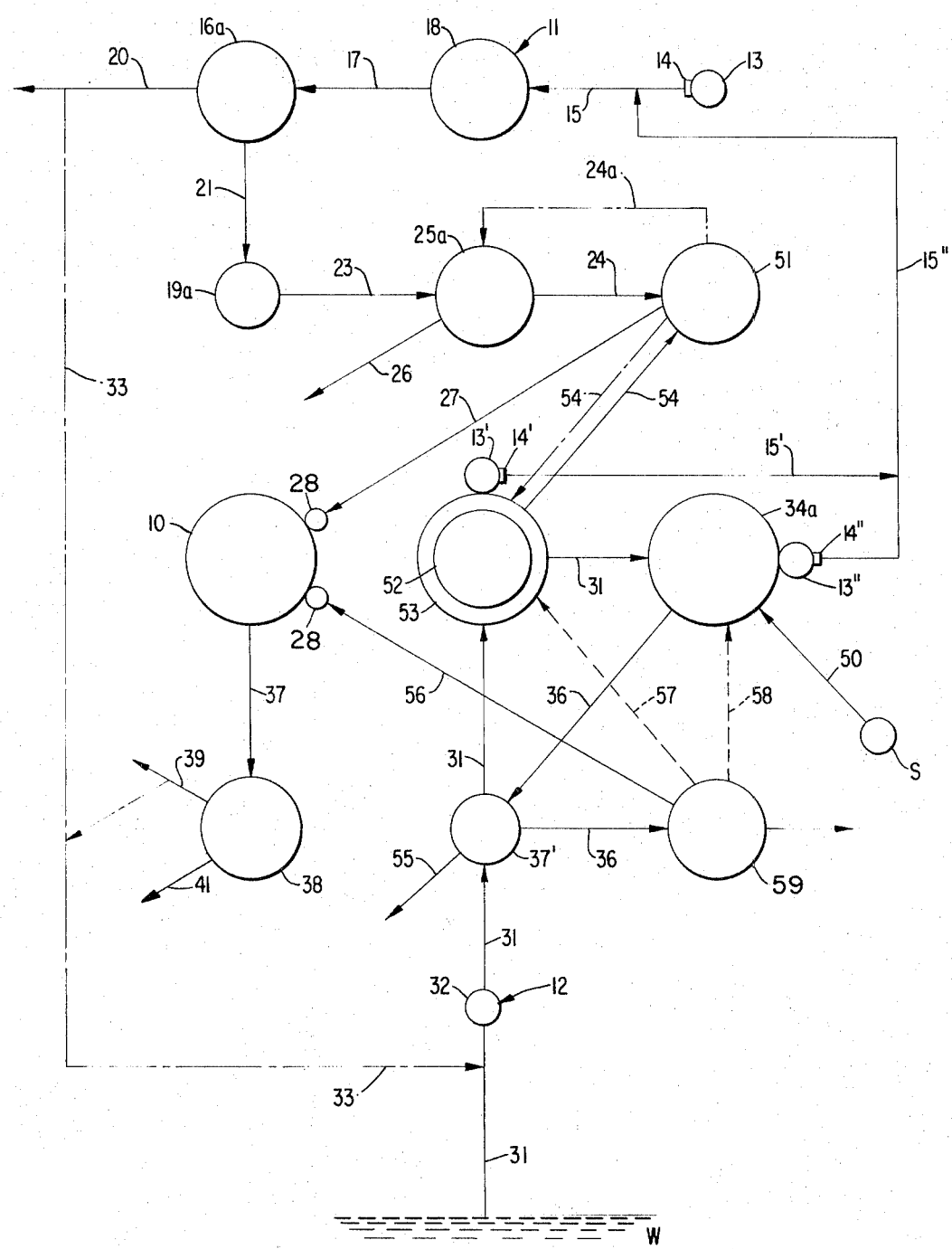
FIG. 4 is a schematic flow diagram illustrating a modification of the embodiment of FIG. 3 in which the carbon dioxide component and hydrogen component produced are separately preheated by ionizing electric arc transducers for providing the required reaction temperature to hydrogenate the produced carbon dioxide to produce methane and pure water.

Another apparatus embodiment of this invention, is illustrated by FIGS. 3 and 4 wherein the solid pipelines indicate primary flow paths of the gases and water to be treated, the dotted pipelines indicate flow paths for recycling of the produced carbon monoxide (CO) fuel gas and the dot-dash pipelines indicate flow paths for recycling of the process water and steam.

At its end at stack 13, gas flow line 11 is provided with a conventional diverting mechanism 14 for diverting substantially all of the ascending gaseous products of combustion of carbonaceous fuel and air into gas flow line 15. In conventional fashion the diverting mechanism 14 is automatically valved to divert the ascending gases in accord with the variations in the stack draft to maintain a diversion of any desired quantities of the ascending gases.

These diverted gases shunted into gas flow line 15 pass from diverting mechanism 14 through line 15 to a cooling unit 18 where the gases are cooled (to a temperature in the range of 80°C.), cooling unit 18 being either a quench type water cooler or preferably a convection type forced air cooler. From cooling unit 18 the gases flow through line 17 into a water/gas separating unit 16a of conventional type, the water (having dissolved in it any nitrogen oxides present) flows from the bottom of unit 16a through pipe 20 to be disposed of, or, preferably, further treated to remove the oxides and condition it for use as hereinafter pointed out. From separator 16a the gases flow through line 21 to a compressor 19a to be compressed to a relatively low pressure (5–10 atms.). From compressor 19a gases flow through line 23 to chamber 25a where an amine (such as diglycolamine) is added in well known fashion. Chamber 25a operates at ambient temperature. The $N_2$ flows from the top of chamber 25a through line 26 to be disposed of (or further treated for purification of the $N_2$) as desired. The $CO_2$ (with any traces of CO) and amine solution flow from the bottom of chamber 25a through line 24 into pipe-still 51 where it is heated by indirect steam heating through pipe 54 to a temperature of approximately 150°C. by steam from the gas fired heater-super heater 52–53 to be presently described, the then cooled steam being returned through extension of line 54 to heater 52 in a closed circulation operation. The practically pure $CO_2$ flows from pipe-still 51 through line 27 to the heater section 52 of heater-super heater 52–53 to assure a temperature suitable for introduction through terminal portion of line 27 into catalytic reaction chamber 10 along with the hereinafter described heated $H_2$ to sustain a reaction temperature of the order of 300°C. to 400°C. in reaction chamber 10 for further processing as herein set forth. The temperature to which the $CO_2$ and the $H_2$ to be combined are raised for introduction into chamber 10, will depend on the catalyst used, the design of the chamber, and the particular design of the processing plant and other factors but may be readily calculated from the reference tables referred to herein by those skilled in the art. The amine solution flows from the bottom of pipe-still 51 through line 24a to be recycled back to chamber 25a.

Further requisite apparatus includes a water intake line 12 which includes a suction pump 32 for removing large quantities of water as required from water source W. The water enters through line 31, passes through pump 32 and issues from line 31 entering heat exchange unit 37' where it is to be filtered and then heated to (or approaching) the vaporization temperature by exchanging heat with the $H_2$ and CO content of line 36 issuing from reaction chamber 34a and passing through unit 37' as hereinafter pointed out.

The minerals, etc., precipitated from the heated water are discharged from unit 37' through line 55 to be disposed of. The heated water passes through line 31 to heater-super heater 52–53 where it is further heated to provide an outflow of super-heated steam which then passes through the terminal portion of line 31 into reaction chamber 34a wherein it steams burning carbon maintained at incandescence by the introduction of oxygen supplied to reaction chamber 34a through line 50 leading from a supply source S to effect the separation of $H_2$ and provide substantial quantities of carbon monoxide (CO), the reaction being $C + H_2O = H_2 + CO$ occurring at approximately 1,000°C. The resulting constituents ($H_2$ and CO) produced by this chemical reaction at high temperature flow through line 36 to unit 37' where the gases are cooled by heat exchange as above set forth. These partially cooled gases pass along the terminal portion of line 36 to gas separating unit 59 where they are separated, making the partially cooled important constituent, $H_2$ and CO, available for the purpose of this invention.

The reaction $C + H_2O = H_2 + CO$ to produce $H_2$ for hydrogenation of $CO_2$ may be accomplished employing carbon derived from any source. One source of carbon that may be utilized might very well be the carbon residue from the pyrolization of solid waste materials (often referred to as trash), and this would be another means of relieving enviromental pollution, particularly in great cities that have enormous quantities of such waste material that is expensive to dispose of.

The separated $H_2$ then passes through line 56 from separator unit 59 through heater section 52 of heater-super heater 52–53 to assure a temperature suitable for introduction through terminal portion of line 56 into catalytic reaction chamber 10 along with the previously described heated $CO_2$ issuing from the terminal portion of line 27 in the presence of a suitable catalyst (nickel) to sustain a Sabatier reaction $CO_2 + 4H_2 = CH_4 + 2H_2O$, the reaction occurring at 300° 400°C.; the reaction is exothermic. The $CH_4$ and $H_2O$ resulting from this reaction then passes out of catalytic reaction chamber 10 through line 37 to conventional cooling and separating unit 38. After separation therein, the $CH_4$ and $H_2O$ each is disposed of through lines 41 and 39 respectively.

The (totally pure) $H_2O$ expelled through line 39 and the treated $H_2O$ expelled through line 20 may be introduced through line 33 into the process water stream ahead of pump 32 to supply a substantial portion of the required process water while the $CH_4$ expelled through line 41 is available as a clean burning reconstructed natural gas energy fuel. The CO produced in chamber 34a and separated in unit 59 is diverted as fuel to chamber 34a through line 58 to establish a kindling temperature to initiate the burning of the carbon, and through line 57 to burn as fuel for heater-super heater 52–53 or for other energy fuel needs of this process.

The combustion gases created by direct firing of heatersuper heater 52–53 and heating of reaction chamber 34a (or any other fuel combustion chamber of this process) enter smoke stacks 13' and 13'' and are directed by mechanisms 14' and 14'' into flow lines 15' and 15'' and thence into gas flow line 15, adding further stack gases to be cycled with the waste stack gas first mentioned. This added stack gas may provide additional $CO_2$ which becomes available for further use or processing as may be desired. To this end, pipe-still 51 is provided with a gas diverting pipeline 27a selectively adapted to divert any excess $CO_2$ to facilitate for further processing and/or use.

FIG. 4 is a modification of the embodiment of FIG. 3 in which the produced carbon dioxide and hydrogen are selectively preheated by ionizing electric arc transducers 28 for providing the reaction temperature required for the reaction in catalytic reaction chamber 10. The recovered $CO_2$ progresses from chamber 51 through line 27 to transducer 28 and thence into reaction chamber 10, and the recovered $H_2$ progresses from unit 59 through line 56 to transducer 28 into catalytic reaction chamber 10, both the $CO_2$ and $H_2$ bypassing heater 52. The transducers may each be actuated by thermostatic controls (not shown) to control the temperature of each gas stream entering catalytic reaction chamber 10.

DESCRIPTION OF OTHER AND PREFERRED APPARATUS EMBODIMENT

Figure 5:
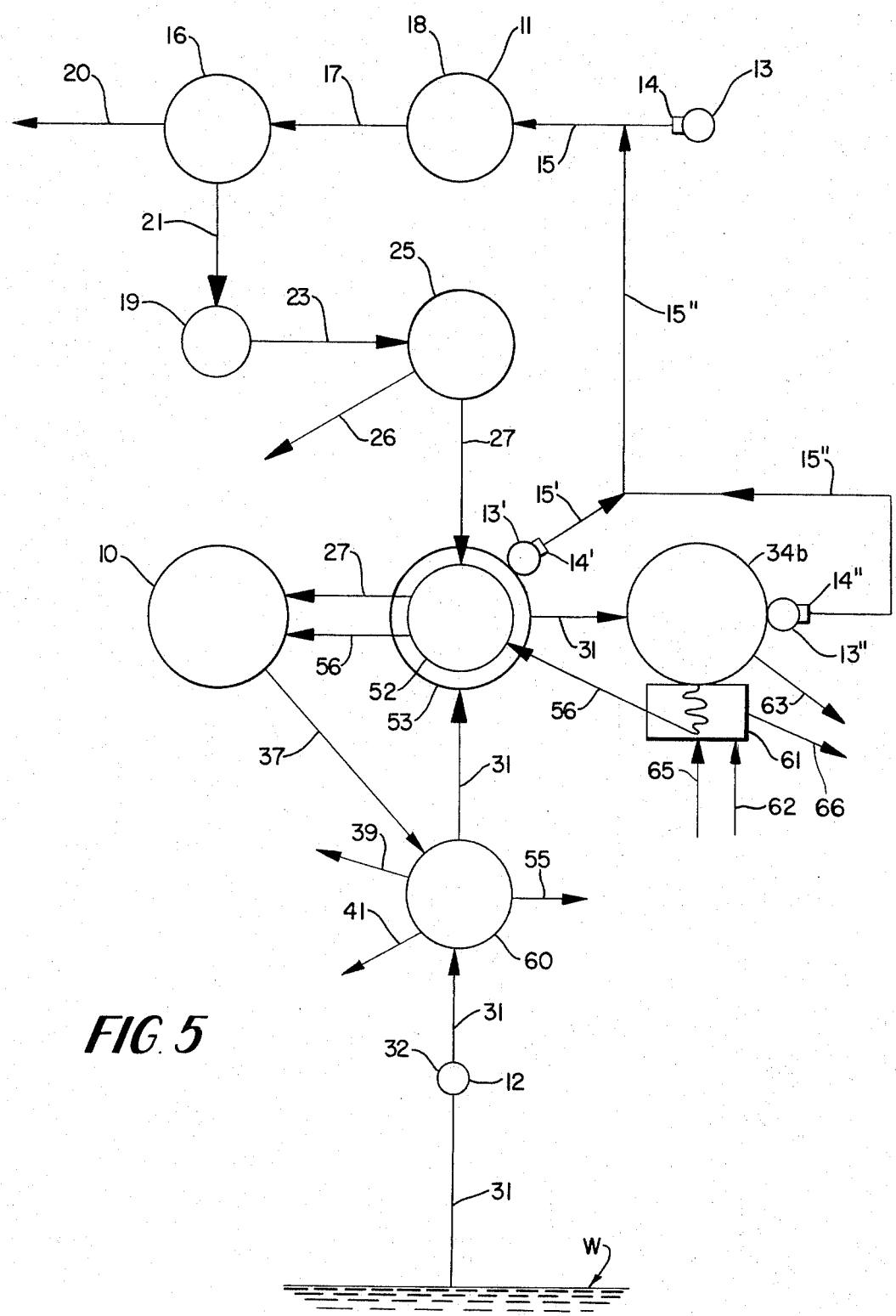
FIG. 5 is a schematic flow diagram illustrating a presently preferred apparatus embodiment for carrying out the present invention wherein the inflow water is processed to recover its hydrogen ($H_2$) component by converting the water to super-heated steam and passing the super-heated steam over suitable powdered metal so the oxidation-reduction reaction produces hydrogen ($H_2$) and the oxide of the metal used.

Another, presently preferred, embodiment of this invention, simple, efficient, and environmentally flexible, is illustrated by FIG. 5 wherein the pipelines indicate primary flow paths of the gases and water to be treated, and the various process progressions.

At its end at stack 13, gas flow line 11 is provided with a conventional diverting mechanism 14 for diverting substantially all of the ascending gaseous products of combustion of carbonaceous fuel and air into gas flow line 15. In conventional fashion the stack gases flow through diverting mechanism 14 and line 15 to a cooling unit 18 where the gases are cooled (to a temperature in the range of 80°C.), cooling unit 18 being either a quench type water cooler or a convection type forced air cooler. From cooling unit 18 the gases flow through flow line 17 into a water/gas separating unit 16 of conventional type, the water flows from the bottom of unit 16 through pipe 20 to be disposed of, or further treated to remove the dissolved oxides to condition it for use. From separator 16 the gases flow through line 21 to compressor 19 to be compressed and then through line 23 at a pressure satisfactory to the requirements of a suitable gas separator 25, preferably a permeator type, to achieve separation of the $CO_2$ and $N_2$ by the process of differential permeation. The $N_2$ flows from differential permeation chamber 25 through line 26 to be disposed of as desired. The practically pure $CO_2$ flows from differential permeation chamber 25 through line 27 to heater 52 to be heated to a suitable temperature for further use in this invention.

Further requisite apparatus includes a water intake line 12 which includes a suction pump 32 for removing large quantities of water as required from water source W. The water enters through line 31, passes through pump 32 and issues from line 31 entering heat exchanger/separator unit 60 where it is filtered and heated to, or approaching, vaporization temperature by exchanging heat with the $CH_4$ and $H_2O$ (vapor) content of line 37 issuing from catalytic reaction chamber 10 and passing through heat exchanger/separator 60 to issue through lines 39 and 41 as heretofore described. Solids precipitated from the heated water are discharged from unit 60 through line 55. The heated water passes through extension of line 31 to heater-super heater 52–53 where it is further heated to provide an outflow of super-heated steam which then passes through the terminal portion of line 31 into reaction chamber 34b wherein the super-heated steam passes in intimate contact with a suitable metal, suitably prepared and under suitable conditions of temperature and pressure, which acts as a reducing agent on the $H_2O$ (oxidation-reduction reaction) to form $H_2$ and an oxide of the metal, as described in the next paragraph.

A very simple, efficient means to cause the decomposition of water to produce $H_2$ by chemical reaction is to convert $H_2O$ to super-heated steam, and then pass it in intimate contact with powdered metal resulting in the creation of $H_2$ and an oxide of the metal. Many metals will perform the desired reaction; however, it is important that a metal be chosen having a metal point above the heat of the reaction. Also, the metal must be one whose hydride and hydroxide are unstable at the temperature of the reaction.

Preferably, reaction chamber 34b should be a vertical cylindrical tower containing a series of support trays. The metal chosen for the reaction, in powdered form, would enter a storage silo 61 by conveyor line 62 where it would be held pending progression into reaction chamber 34b, and would be preheated in silo 61 in the manner hereinafter pointed out and purged with inert gas (as available $N_2$) supplied through pipeline 65 and removed through pipeline 66 during preheating. Super-heated steam would enter tower 34b at the bottom and pass upwards therethrough at a rate calculated to complete the reaction. Upon completion of the reaction the high temperature $H_2$ would pass from the top of tower 34b through pipeline 56. Pipeline 56 would pass as a coil through silo 61 to preheat the powdered metal contained therein for future use in tower 34b, and would then continue through line 56 to heater 52 where the $H_2$ is heated to a suitable temperature to be delivered into chamber 10 through terminal portion of line 56 along with the heated $CO_2$ delivered through terminal portion of pipeline 27 to initiate the reaction $CO_2 + 4H_2 = CH_4 + 2H_2O$, the reaction taking place in chamber 10 in the presence of a suitable catalyst at 300°C. – 400°C. The metal oxide creation by the oxygen freed by decomposition of the $H_2O$ in chamber 34b would pass from tower 34b through conveyor line 63 while the resultant $H_2O$ and $CH_4$ separated in unit 60 will discharge through lines 39 and 41 as heretofore described.

As the reaction in chamber 34b is highly exothermic, only minimum applied heating would be required to initiate the reaction. Determination can be easily made of the temperature and pressure at which the reaction would take place. As an example, if Mg were chosen as the used powdered metal the super-heated steam would flow from heater-super heater 52–53 through pipe 31 and enter tower 34b at a temperature which would support a reaction at approximately 480°C. and pass upwards at a low pressure (in the order of 1–5 atms.).

Smoke stack 13' of heater-super heater 52–53 is equipped with diverting mechanism 14' to divert heater combustion gases through line 15' into line 15''; smoke stack 13'' of reaction chamber 34b is equipped with diverting mechanism 14'' to divert combustion gases into line 15''; the combined combustion gases of stack 13' and 13'' thence flow together through line 15'' into stack gas line 15 where it combines with the stack gas diverted from stack 13 into gas flow treating line 11 (as in FIGS. 3 and 4). This diverting of the combustion gases from heater-super heater 52–53 and reaction chamber 34b serves the dual purpose of preventing further air pollution from raw stack gases and of accumulating additional carbon atoms for re-utilization in the making of methane ($CH_4$) by this invention.

Scrap iron and scrap aluminum, now an environmental waste product or pollutant in vast supply, would provide suitable reducing agents when powdered. While Magnesium can be made in limitless quantity from the sea water to be decomposed for use as the reducing agent, the antipollution purpose of this invention will be best served by utilizing the scrap metals.

ALTERNATE EMBODIMENT

Figure 6:
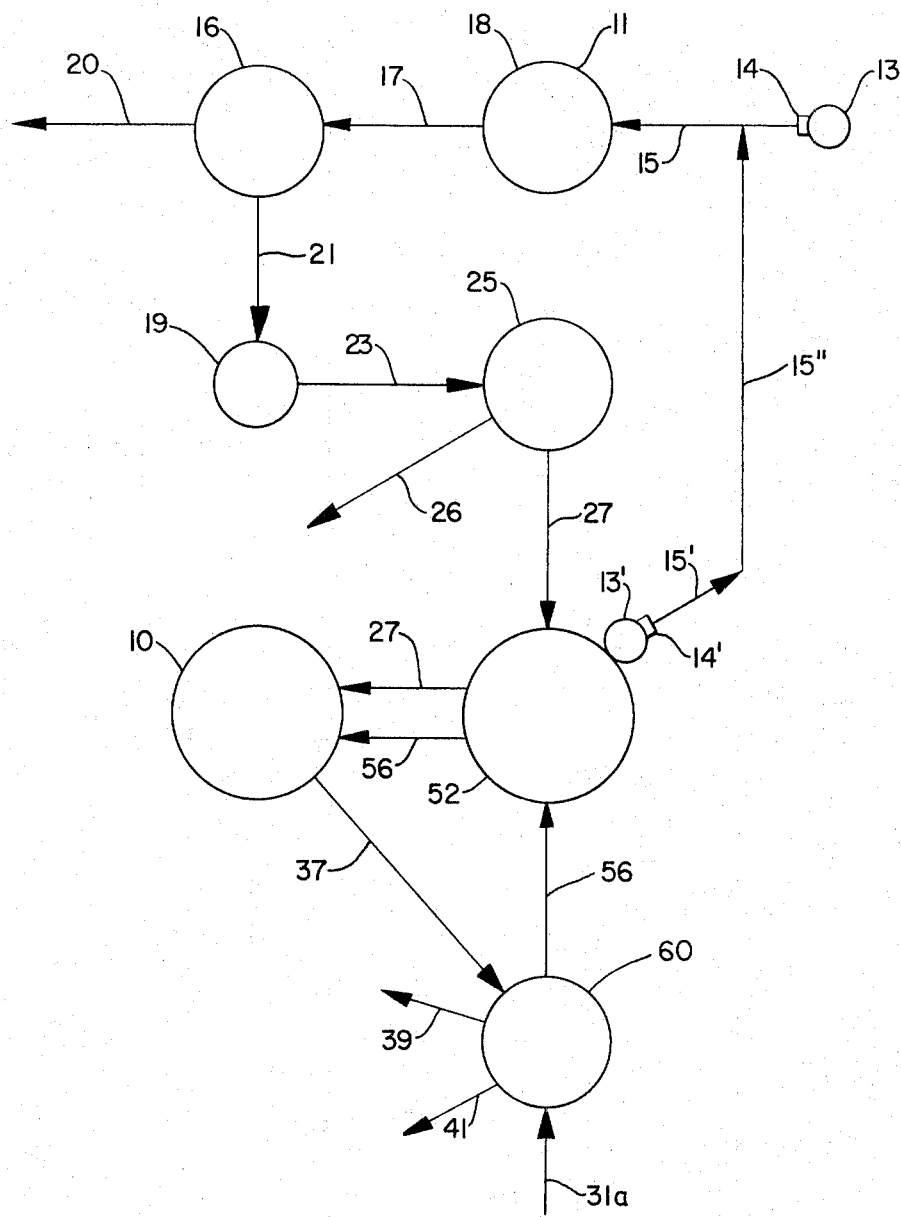
FIG. 6 is a schematic flow diagram illustrating a modification of FIG. 5 in which the on site produced carbon dioxide is catalytically hydrogenated with hydrogen obtained from water processed at a remote source for example, at a thermo-nuclear energy generating plant located safely off-shore on an island where the hydrogen is produced by electrolysis or any suitable chemical reaction utilizing heat produced by the generating plant and supplied by pipeline to the site of use of this invention to form methane ($CH_4$) and pure water.

FIG. 6, beginning at smoke stack 13, employs a gas flow line extending into catalytic reaction chamber 10 which is identical to gas flow line 11 of FIG. 5 and stack gas accumulating apparatus 13', 14', and 15' including the terminal portion of line 15'' functioning as described in the embodiment of FIG. 5.

The means of FIG. 6 of providing hydrogen ($H_2$) for catalytic reaction chamber 10 contemplates the decomposition of water and separation of its $H_2$ at a site remote from the other apparatus of this invention (as an example, by electrolytic cell means or chemical reaction process at a thermo-nuclear energy generating plant located on an island safely offshore) and transportation of the $H_2$ by pipeline 31a to heat exchanger/separator 60. In FIG. 6 the $H_2$ is ingested into heat exchanger/separator 60, modified to eliminate line 55 not required in this embodiment, through line 31a where it exchanges heat with the $CH_4$ and $H_2O$ (vapor) mixture emanating from catalytic reaction chamber 10 through line 37, to heat exchanger/separator 60. Hydrogen progresses from unit 60 through line 56 to heater 52 and thence to catalytic reaction chamber 10, in identical fashion as in FIG. 5. The resultant $H_2O$ and $CH_4$ passing through heat exchanger/separator 60 issues through lines 39 and 41 as heretofore described.

Sabatier's work represents the initial competent work on catalysis and was accomplished in the early part of this century (See reference 4 below). Since that time a tremendous amount of work has been done on the subject, much of which has resulted in methods, tables and means to make calculations of reaction chamber design, choice of catalysts and other materials required, operating techniques, temperatures and pressures, economics, etc. So, too, has much work been published on subjects pertinent to other phases of this invention, i.e., heat of reactions, compression of gases, separating of gases, BTU content of gases, equilibriums, oxidation-reduction reactions, etc.

The pertinent methods, means and information in various physical and chemical publications and handbooks, including, but not limited to, the following are herein included by reference and made a part hereof in further exemplification of the application disclosure:

1. *Selected Values of Physical and Thermodynamic Properties of Hydrcarbons and Related Compounds.* Comprising the Tables of the American Petroleum Institute Research Project 44, Extant as of Dec. 31, 1952. By Rossini, Pitzer, Arnett Braun and Pimentel. Published for the American Petroleum Institute by Carnegie Press, Carnegie Institute of Technology, Pittsburgh, Pa., 1953.

2. *Selected Values of Chemical Thermodynamic Properties.* Circular of the National Bureau of Standards 500. By Rossini, Wagman, Evans, Levine and Jaffe. Issued Feb. 1, 1952, U.S.G.P.O., Washington, D.C.

3. *Selected Values of Properties of Hydrocarbons and Related Compounds*, 1968 API Research Project 44. (27 volumes; 10,539 pages; Reference 1. above is a part hereof) Texas A & M Research Foundation. F.F. Box 130, College Station, Tex. 77843.

4. *Catalysis in Organic Chemistry.* By Paul Sabatier, translated by E. Emmet Reid. D. Van Nostrand Company, Eight Warren Street, New York, 1922.

5. *Catalysis*, 7 volumes. (*Hydrocarbon Synthesis, Hydrogenation and Cyclization*, Vol. IV) Edited by Paul H. Emmett. Reinhold Publishing Corporation, New York, 1954/1961.

6. *Advances in Catalysis and Related Subjects*, Vol. XI. Edited by Eley, Selwood and Weisz. Academic Press, Inc., New York, 1959.

7. *Industrial Hydrogen.* By Hugh S. Taylor. The Chemical Catalog Company, Inc. One Madison Avenue, New York, 1921.

8. *Research Paper RP* 1050, Journal of Research of the Natiol Bureau of Standards, Vol. 19, Dec. 1937. By John W. Knowlton and Frederick D. Rossini.

9. *Gas Engineers' Handbook*, McGraw-Hill Co. First Edition, 1934.

10. *Gas Engineer' Handbook, Industrial Press.* New York, 1969.

By the proper use of these now available methods, tables, means and information, calculations can be made by one skilled in the arts to provide the correct answers to make this invention operable, practical and economically feasible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of utilizing industrial plant stack gases, normally dispersed through a smoke stack into the atmosphere as an air pollutant, and water to produce methane gas ($CH_4$) for combustible fuel and pure water comprising the steps of diverting a substantial portion of the stack gas into a gas line and treating the diverted stack gases to reduce the gases to their carbon dioxide and nitrogen ($CO_2$ and $N_2$) components, substantially dehydrated and freed from deleterious compounds; separating the carbon dioxide and nitrogen and diverting the nitrogen for future use; simultaneously directing water into a water line and treating the water to dissociate it into its constituents to recover the hydrogen; and directing the carbon dioxide and hydrogen in proportions of the order of 20% $CO_2$ and 80% $H_2$ into a catalytic reaction chamber in the presence of a suitable catalyst and sufficient heat to establish a reaction temperature to induce the desired Sabatier catalytic reaction ($CO_2 + 4H_2 = CH_4 + 2H_2O$) thereby hydrogenating the carbon dioxide to form methane and water vapor; cooling the formed methane and water vapor; separating the resulting methane to be used as fuel; and diverting the resulting pure water component for desired use.

2. A method of utilizing smoke stack gases, normally dispersed through a smoke stack into the atmosphere as an air pollutant, and water to produce methane gas ($CH_4$) for combustible fuel and pure water, comprising the steps of diverting a substantial portion of the stack gas into a gas line and treating the diverted stack gases to effect the release and recovery of its carbon dioxide component, substantially dehydrated and freed of nitrogen and deleterious compounds; simultaneously directing water in a water line and treating the water to effect the release and recovery of its hydrogen component; introducing the recovery carbon dioxide and hydrogen in requisite proportions into a catalytic reaction chamber in the presence of a suitable catalyst and sufficient heat to establish a reaction temperature to induce the desired Sabatier catalytic reaction ($CO_2 + 4H_2 = CH_4 + 2H_2O$) thereby hydrogenating the carbon dioxide to form methane and water vapor; cooling the formed methane and water vapor to liquefy and separate the water from the resulting methane to be used as fuel; and diverting the resulting water for desired usage.

3. The method of claim 2 wherein the recovered carbon dioxide and hydrogen are separately raised to a temperature such that upon combining in the catalytic reaction chamber the reaction chamber temperature will be of the order of 300° to 400° Centigrade.

4. The method of claim 3 wherein the recovered carbon dioxide and recovered hydrogen are heated prior to their entry into the catalytic reaction chamber to establish the reaction temperature.

5. The method of claim 2 wherein the flow water is converted to dry superheated steam for introduction into a reaction chamber containing a burning carbonaceous mass to effect the production of the hydrogen ($H_2$) and carbon monoxide (CO) the latter of which is separated and utilized as fuel for the heating.

6. The method of claim 3 wherein the temperature is raised by impacting electro energy into the gaseous molecules of the carbon dioxide and hydrogen as they are directed into the catalytic reaction chamber to raise the molecules to a level of great excitation inthe infrared range of the electromagnetic spectrum to establish a reaction temperature within the catalytic reaction chamber of the order of 300° to 400° Centigrade.

7. The method of claim 1 wherein the diverted water component is directed into the industrial plant's water system for usage.

8. The method of claim 2 wherein the recovery of hydrogen effected by heating the inflow water to convert it to super-heated steam, introducing the super-heated steam together with oxygen into a reaction chamber containing carbon burning at incandescence thereby establishing an oxidation-reduction reaction freeing the hydrogen ($H_2$) component of the steam by combining the oxygen component with the carbon to produce carbon monoxide (CO) to be used as fuel to convert the inflow water to super-heated steam, to establish the reaction temperature required by the Sabatier catalytic reaction, and to heat the reaction chamber in which the carbon is burned at incandescence.

9. The method of claim 8 wherein the heating is effected by means of direct fired heaters and the combustion gases of the direct fired heaters are diverted into the gas flow line to augment the diverted smoke stack gases and provide additional carbon dioxide for recovery and hydrogenation.

10. The method of claim 9 wherein the produced carbon monoxide (CO) is recovered and recycled as processing fuel to said direct fired heaters, to kindle said reaction chamber containing carbon burning at incandescence and to provide other fuel needs of the process.

11. The method of claim 2 wherein the recovery of hydrogen is effected by heating the inflow water to convert it to super-heated steam, introducing the super-heated steam into intimate contact with a suitable reducing agent contained in a reaction chamber under suitable conditions of temperature and pressure to establish an oxidation-reduction reaction decomposing the super-heated steam to free and recover its hydrogen component ($H_2$) for use in hydrogenating the recovered carbon dioxide ($CO_2$) to form methane ($CH_4$) and water vapor and produce an oxide of the reducing agent.

12. The method of claim 11 wherein the oxidation-reduction reaction dissociating the super-heated steam is an exothermic reaction effected by passing the super-heated steam upwardly through the reaction chamber in contact with the powdered metal particles supported on tiered trays and moved through the reaction chamber from storage to a conveyor for recovery and wherein the recovered high temperatre hydrogen ($H_2$) produced by the exothermic reaction is piped from the reaction chamber for introduction into said catalytic reaction chamber.

13. The method of claim 12 wherein the recovered high temperature hydrogen ($H_2$) is piped through the stored powdered metal to preheat the powdered metal.

14. The method of claim 3 wherein the recovery of hydrogen is effected at a site remote from the gas flow line and catalytic reaction chamber and transported by pipeline to the catalytic reaction chamber and separately preheated for combining with the separately preheated recovered carbon dioxide to establish the reaction chamber temperature.

15. Apparatus for utilizing smoke stack gases and available water to produce methane gas ($CH_4$) for combustible fuel and pure water comprising a gas flow line including gas diverting means opening into the smoke stack to divert substantial quantities of the stack gases into the flow line; means for effecting removal of water and certain deleterious compounds ompounds from the diverted stack gases and cooling the diverted gases to reduce the temperature of the treated diverted stack gases to a desired level for compression; compressor means for compressing the cooled diverted stack gases to a pressure assuring a gas flow at efficient pressure; means for separating the compressed diverted stack gases into its carbon dioxide and nitrogen components and directing the separated gases through respective outlet lines for further treatment of the separated carbon dioxide and subsequent usage of the spearated nitrogen; a water flow line including means for removing desired quantities of water from a source of water supply; means for dissociating the water into its constituents to recover the hydrogen component; catalytic reaction chamber means for receiving the separated heated carbon dioxide component and the dissociated hydrogen component in suitable proportions in the presence of a suitable catalyst to establish a reaction temperature sufficient to induce the desired Sabatier reaction ($CO_2 + 4H_2 = CH_4 + 2H_2O$) hydrogenating the carbon dioxide to form methane and pure water; separating means adapted adapted to separate and direct the resulting methane to be recycled as energy fuel and separate and direct the resulting pure water for subsequent usage.

16. The apparatus of claim 15 wherein said heating means comprises respective ionizing transducer means fixed to the catalytic reaction chamber means to receive the entering carbon dioxide and hydrogen and raise the temperature of the gases by impacting electro energy into the gases in said transducer means to thereby establish the reaction temperature.

17. The apparatus of claim 15 wherein the means for dissociating the water into its constituents comprises a gas heated reaction chamber containing carbon raised to incandescence by the introduction of super-heated steam and oxygen into the chamber, to produce hydrogen and carbon monoxide, and means to recycle the resulting carbon monoxide as a fuel for heating said reaction chamber.

18. The apparatus of claim 15 wherein said last mentioned separating means includes an outlet line for directing the resulting water into the plant's water system.

19. The apparatus of claim 15 wherein said last mentioned separating means includes an outlet line for recycling the resulting methane for use as primary fuel.

20. The apparatus of claim 15 wherein the means for dissociating the water into its constituents comprises means for converting the flow water into super-heated steam, reaction chamber means including a reducing agent and an inlet for said super-heated steam, said reaction chamber being maintained under suitable conditions of temperature and pressure to effect an oxidation-reduction reaction upon intimate contact of said steam with the reducing agent thereby freeing the hydrogen ($H_2$) constituent of said steam for delivery to said catalytic reaction chamber to hydrogenate the recovered carbon dioxide to produce methane ($CH_4$) and pure water and combining the oxygen ($O_2$) constituent with the reducing agent to oxidize the reducing agent.

21. The apparatus of claim 20 wherein the reaction chamber means comprises a storage silo containing a suitable metal in powdered form as the reducing agent; means for purging the powdered metal with inert gas; a reaction chamber having inlet means for directing the super-heated steam into said reaction chamber at the bottom to pass through said reaction chamber and the contained powdered metal to establish a reaction temperature and oxidation-reduction reaction freeing the hydrogen and combining the oxygen with the powdered metal to form an oxide of the metal; outlet pipe means at the top of the reaction chamber concerned to convey the freed hydrogen to said catalytic reaction chamber for introduction along with the recovered carbon dioxide to hydrogenate the carbon dioxide and form methane and pure water.

22. The apparatus of claim 21 wherein means is provided for preheating the powdered metal.

23. The apparatus of claim 22 wherein said preheating means comprises a portion of said outlet pipe means passing through said stored powdered metal.

24. The apparatus of claim 15 wherein said gas flow line for treating the stack gases and recovering the carbon dioxide, said catalytic reaction chamber, and said means for heating the recovered carbon dioxide and hydrogen are located proximately to the emitted smoke stack gases and includes a pipeline leading to said means for dissociating water, which means is remotely located for delivering the recovered hydrogen to said means for heating the carbon dioxide and hydrogen.

* * * * *

UNITED STATES PATENT OFFICE
CERTIFICATE OF CORRECTION

Patent No. 3,820,965          Dated   June 28, 1974

Inventor(s)   ROBERT V. NEW

It is certified that error appears in the above-identified patent and that said Letters Patent are hereby corrected as shown below:

Column 6, line 3, change "wih" to --with--.

Column 8, line 44, change "gase" to --gases--.

Column 16, line 4, after "water" insert a comma (,).

Column 16, next to the last line, change "inthe" to --in the--.

Column 17, line 43 (claim 12), after "wherein" insert --said suitable reducing agent is powdered metal particles and--.

Column 18, line 3, delete --ompounds--.

Column 18, line 13, change "spearated" to --separated--.

Column 18, line 25, delete --adapted-- (second occurrence).

Signed and sealed this 29th day of October 1974.

(SEAL)
Attest:

McCOY M. GIBSON JR.
Attesting Officer

C. MARSHALL DANN
Commissioner of Patents